(12) United States Patent
Griffin

(10) Patent No.: US 8,527,010 B2
(45) Date of Patent: *Sep. 3, 2013

(54) DEVICE, SYSTEM, AND METHOD FOR INFORMING USERS OF FUNCTIONS AND CHARACTERS ASSOCIATED WITH TELEPHONE KEYS

(75) Inventor: Jason Tyler Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/973,555

(22) Filed: Dec. 20, 2010

(65) Prior Publication Data

US 2011/0084908 A1   Apr. 14, 2011

Related U.S. Application Data

(63) Continuation of application No. 11/164,803, filed on Dec. 6, 2005, now Pat. No. 7,869,832.

(60) Provisional application No. 60/724,458, filed on Oct. 7, 2005.

(51) Int. Cl.
*H04M 1/72* (2006.01)

(52) U.S. Cl.
USPC ............ 455/566; 455/550.1; 455/575.1; 455/414.1; 455/418; 341/23; 345/168

(58) Field of Classification Search
USPC ............ 455/566, 550.1, 575.1, 575, 552.2, 455/445, 41.2, 90.2, 575.3, 414.1, 418; 345/173, 156, 169, 168; 340/572.8; 235/462.08; 341/23, 28
See application file for complete search history.

(56) References Cited

U.S. PATENT DOCUMENTS

| | | | |
|---|---|---|---|
| 5,917,905 A | 6/1999 | Whipple et al. | |
| 6,219,694 B1 | 4/2001 | Lazaridis et al. | |
| 6,243,460 B1 | 6/2001 | Bhagavatula | |
| 6,307,541 B1 | 10/2001 | Ho et al. | |

(Continued)

FOREIGN PATENT DOCUMENTS

| DE | 10027146 A1 | 11/2001 |
|---|---|---|
| EP | 0567333 A | 10/1993 |

(Continued)

OTHER PUBLICATIONS

Examination Report mailed Aug. 19, 2008. In corresponding application No. 05257504.0.

(Continued)

*Primary Examiner* — Mahendra Patel
(74) *Attorney, Agent, or Firm* — Novak Druce Connolly Bove + Quigg LLP

(57) ABSTRACT

System and method for informing a user of functions or characters associated with keys on a mobile communications device includes a keyboard operable to input dual-tone multi-frequency (DTMF) codes and a display screen operable to display information. The display screen is also operable to display a virtual representation of at least a portion of the keyboard. The virtual representation includes help information on one or more virtually represented keys of the keyboard. This help information informs a user of an associated telephone function or character of one or more keys that are virtually represented on the display.

20 Claims, 9 Drawing Sheets

(56) References Cited

U.S. PATENT DOCUMENTS

| | | |
|---|---|---|
| 6,483,913 B1 | 11/2002 | Smith |
| 6,519,482 B1 | 2/2003 | Mittelstadt et al. |
| 6,594,484 B1 | 7/2003 | Hitchings, Jr. |
| 7,007,239 B1 | 2/2006 | Hawkins et al. |
| 7,159,180 B2 | 1/2007 | Ward |
| 7,289,768 B2 | 10/2007 | Kim |
| 7,363,059 B1 | 4/2008 | Lundy |
| 2001/0014615 A1 | 8/2001 | Dahm et al. |
| 2002/0025837 A1 | 2/2002 | Levy |
| 2002/0054676 A1* | 5/2002 | Zhao et al. .................... 379/354 |
| 2002/0181671 A1 | 12/2002 | Logan |
| 2003/0172046 A1* | 9/2003 | Scott ................................ 707/1 |
| 2004/0198244 A1* | 10/2004 | Jarrad et al. ............. 455/550.1 |
| 2004/0242279 A1* | 12/2004 | Costanzo et al. ............ 455/566 |
| 2004/0253973 A1* | 12/2004 | Nguyen et al. ............. 455/550.1 |
| 2005/0130642 A1 | 6/2005 | Scott |
| 2005/0157860 A1 | 7/2005 | Schnarel et al. |
| 2005/0250547 A1* | 11/2005 | Salman et al. ................ 455/566 |
| 2006/0103623 A1* | 5/2006 | Davis ......................... 379/93.18 |
| 2006/0168539 A1 | 7/2006 | Hawkins et al. |
| 2007/0004460 A1* | 1/2007 | Tsampalis .................... 455/566 |
| 2007/0047722 A1 | 3/2007 | Kunimune |
| 2007/0279256 A1* | 12/2007 | Salman et al. .................. 341/23 |

FOREIGN PATENT DOCUMENTS

| | | |
|---|---|---|
| EP | 1263195 A | 12/2002 |
| EP | 1317117 A | 6/2003 |
| EP | 1416702 A | 5/2004 |
| FR | 2837941 A | 10/2003 |
| GB | 2402650 A | 12/2004 |
| WO | WO 03056784 A2 * | 7/2003 |

OTHER PUBLICATIONS

Examination Report mailed Aug. 30,2006. In corresponding application No. 05257504.0.

Office Action mailed Feb. 24, 2010. In Canadian application No. 2,562,972.

Office Action mailed Mar. 7, 2011. In Canadian application No. 2,562,972.

ITU-T Q.23 International Telecommunication Union. ; General recommendations on telephone switching and signalling. International Automatic and Semi-Automatic working. Technical features of push-button telephone sets. ITU-T Recommendation Q.23. (Extract from the Blue Book). Downloaded by EPO on Apr. 13, 2011.

ITU-T E.161 Telecommunication Standardization Sector of ITU. Series E: Overall network operation, telephone service, service operation and human factors. International operation-Numbering plan of the international telephone service. Downloaded by EPO on Apr. 13, 2011.

Examination report mailed Mar. 8, 2012; in corresponding European patent application No. 05257504.0.

Office Action mailed Mar. 22, 2012; in corresponding Canadian patent application No. 2,562,972.

* cited by examiner

DEVICE, SYSTEM, AND METHOD FOR INFORMING USERS OF FUNCTIONS AND CHARACTERS ASSOCIATED WITH TELEPHONE KEYS

CROSS-REFERENCE TO RELATED APPLICATION

This is a continuation application of application Ser. No. 11/164,803, filed on Dec. 6, 2005 now U.S. Pat. No. 7,869,832 and which is entitled "DEVICE, SYSTEM, AND METHOD FOR INFORMING USERS OF FUNCTIONS AND CHARACTERS ASSOCIATED WITH TELEPHONE KEYS;" which claims the benefit of U.S. Provisional Application No. 60/724,458, filed Oct. 7, 2005 and which is entitled "SYSTEM AND METHOD FOR USING NAVIGATIONAL COMMANDS ON A MOBILE COMMUNICATION DEVICE AND FOR INPUTTING DTMF CODES;" said applications are hereby expressly incorporated into the present application by reference, including the entirety of the written descriptions, drawings, and figures.

FIELD

This disclosure concerns a technique for entering alphabetic phone numbers on a non-ITU Standard E.161 phone keypad arrangement, such as that utilized on mobile communication devices having either full QWERTY or reduced QWERTY formats.

BACKGROUND

When entering phone numbers that contain letters, for example, 1-800-FLOWERS, or when navigating some computer controlled answering systems, such as those that require entry of the last name of a person in a directory, the user is entering dual-tone multi-frequency (DTMF) codes for numbers that have certain letters associated with them in an ITU Standard E.161 phone keypad, shown in FIG. 9. When you have a non-standard keypad, like a QWERTY or a reduced QWERTY that is combined with a numeric phone arrangement on a keyboard, entering letters when in phone mode becomes more difficult. An example of this type of keyboard is provided on the BLACKBERRY 7100 series (a mobile communication device) for a reduced QWERTY arrangement and on the BLACKBERRY 6230 series (a mobile communication device) for a full-sized QWERTY alphabetic arrangement.

One attempt to solve this problem is to require the user to hold down the ALT key and then multi-tap the letter keys until the appropriate letter is selected for each letter in the phone number. The name 1-800-FLOWERS appears on the display screen, but the user is not informed of the actual number being dialed.

Another related problem involves answering services that have automated menu systems that are controlled by DTMF codes. Inputting DTMF codes with these systems takes a long time to play the recorded messages that accompany the answering system menus. Furthermore, voice mail systems are also controlled over the phone by DTMF codes. This requires the user to either listen to all the control options or memorize which keys correspond to which options. One attempt to solve this is to provide the user with a reference card, but this involves the inconvenience of carrying the reference card around and pulling it out when needed.

DETAILED DESCRIPTION

Figure 1:
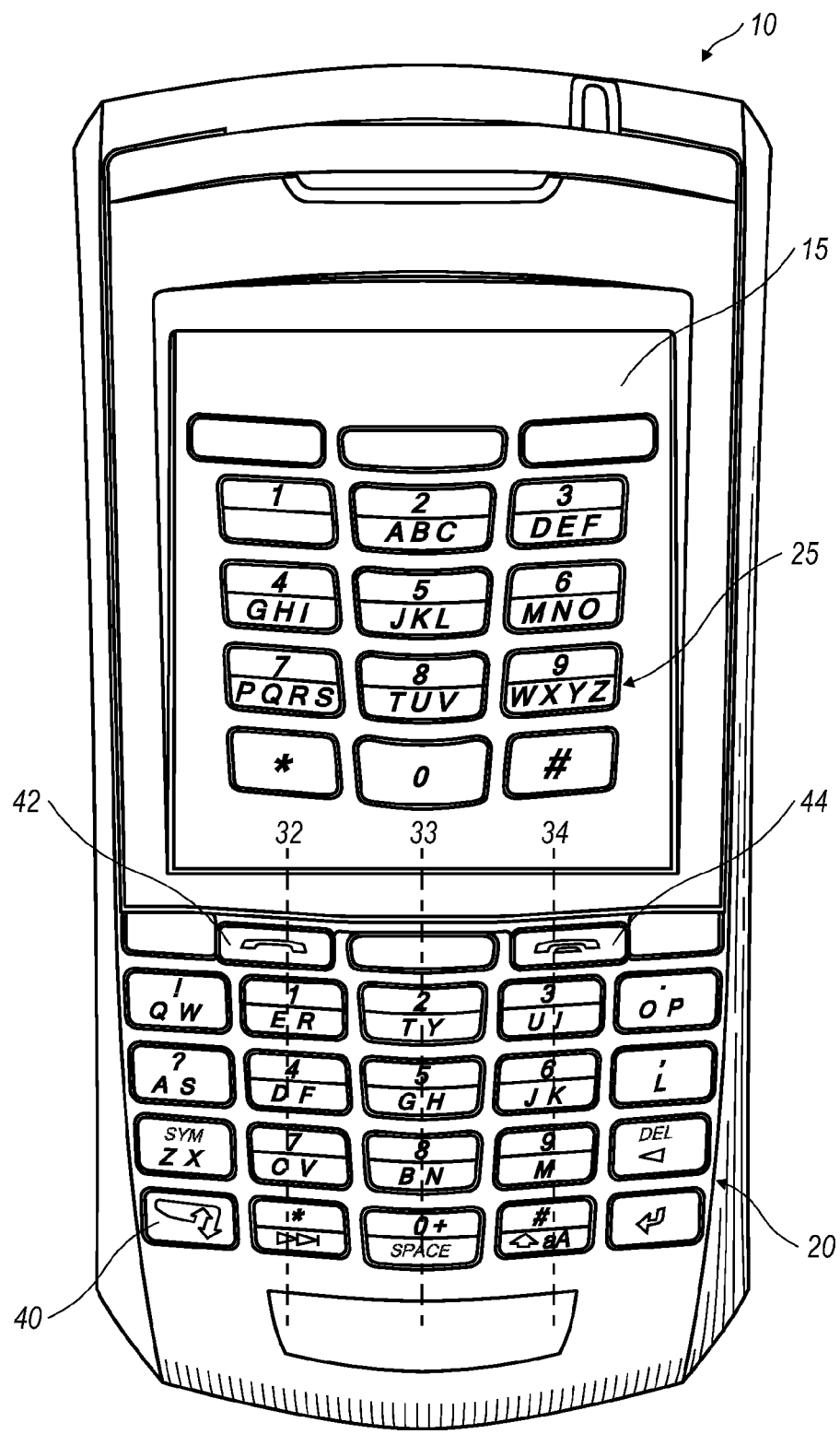
FIG. 1 is a front view of an example mobile communication device displaying an example help screen.

This disclosure concerns a mobile communication device having a reduced format keyboard, as described in U.S. patent application Ser. No. 10/785,790, the disclosure of which is incorporated herein by reference in its entirety. This disclosure also concerns a full-size alphabetic format keyboard, such as that used on the BLACKBERRY 6230 device (a mobile communication device). Reduced format keyboards include the alphabetic characters, A-Z, and are arranged in a standard alphabetic keyboard format. The alphabetic characters are presented on fewer than twenty-six keys such that some alphabetic characters share keys with other alphabetic characters. The keyboard also includes a numeric phone arrangement of numbers 0-9, such that the mobile communication device may be used for sending and receiving phone calls, and for sending and receiving emails, among other types of messages, such as Short Message Service (SMS), or otherwise. Full-size keyboards include alphabetic characters A-Z that are arranged in a standard alphabetic keyboard format and a numeric phone arrangement of numbers 0-9 shares keys with the alphabetic characters.

The examples described herein provide different techniques for informing a user of the letters or functions that correspond to the numbers of a phone keypad. In a first example, shown in FIG. 1, an example mobile device 10 includes a display screen 15, and a keypad 20. The keypad includes a reduced format QWERTY arrangement of indicia with an overlaid numeric phone key arrangement. The numeric portion of the indicia is consistent with an ITU standard E.161 format. The display screen 15 is operable to display a help screen 25 that is a virtual representation of a portion of the keypad 20. The virtual representation in this example is an image that approximates the size and shape of the middle three columns 32-34 of the keypad 20. Other types of virtual representations may also be used that are not images approximating the size and shape of the keys of the keypad 20. The screen 15 displays the images of the keys with help information. In this example, the help information is an ITU standard E.161 phone key arrangement that includes both the numeric and alphabetic components of the standard. This informs the user of what key strokes are necessary in order to enter letters and the corresponding DTMF codes that are shown on the virtually represented keys.

In the example method, the user enters a command to pull up a help screen 25 that displays an ITU Standard E.161 phone key arrangement. For example, the user may select the "ALT" key 40, or some other control key to initiate a command to display the help screen 25 on the display 15. The help screen 25 could alternatively be displayed via a pull down menu activated by a thumbwheel or another key, or in any known way. It could also be displayed automatically upon putting the example mobile communication device 10 into a telephone mode. Any of these techniques could be programmed into the device's programming software.

Although the three middle columns of keys 32-34 on the keyboard 20 will normally function to enter DTMF codes corresponding to the alphabetic letters and numbers on the ITU Standard E.161 phone key arrangement, the help screen 25 informs the user of the alphabetic character that corresponds to the numeric indicia present on the keys. The DTMF codes will not be entered according to the alphabetic indicia printed on the keypad 20. The shape of the displayed keys on the help screen 25, as shown, corresponds to that of the keys in the three middle columns 32-34 on the keypad 20. This enhances the user recognition that the help screen 25 corresponds to the keypad 20. Alternatively, key shapes shown on the display do not have to be the same as those used on the keypad.

By using the help screen 25, the user can locate the key corresponding to the desired letter and press the corresponding key on the keypad 20 of the device 10 to obtain the appropriate DTMF code. For example, the phone number 1-800-FLOWERS would be entered by pressing the keys on the keyboard with the numeric indicia 1, 8, 0, 0, 3, 5, 6, 9, 3, 7, 7. As the number is entered, the numbers can be shown in the upper part of the display screen 15 that is not covered by the virtual representation of the middle column portion of the keypad, or on some other part of the screen 15. After the last number is pressed and the phone call is initiated by pressing, for example, the call key 42 in the second column 32, the help screen 25 may automatically disappear or it may stay up until the call is ended, for example, by pressing the call-end key 44. Alternatively, the user could be required to input a command, such as the "ALT" command, to make the help screen disappear.

The help screen 25 can also be used when entering alphabetic information after a call is initiated. For example, some answering services allow a user to dial the name of a person in the answering service directory. These answering services are programmed to receive alphabetic information from an ITU standard E.161 phone key arrangement. Thus, a user can pull up the help screen 25 and use the alphabetic letters displayed on the help screen keys as a guide to the corresponding keys on the keypad 20. In another example, the help screen 25 could be used to assist the user in entering alphanumeric information for relating reference numbers over the phone such as account numbers that include alphabetic characters.

Figure 2:
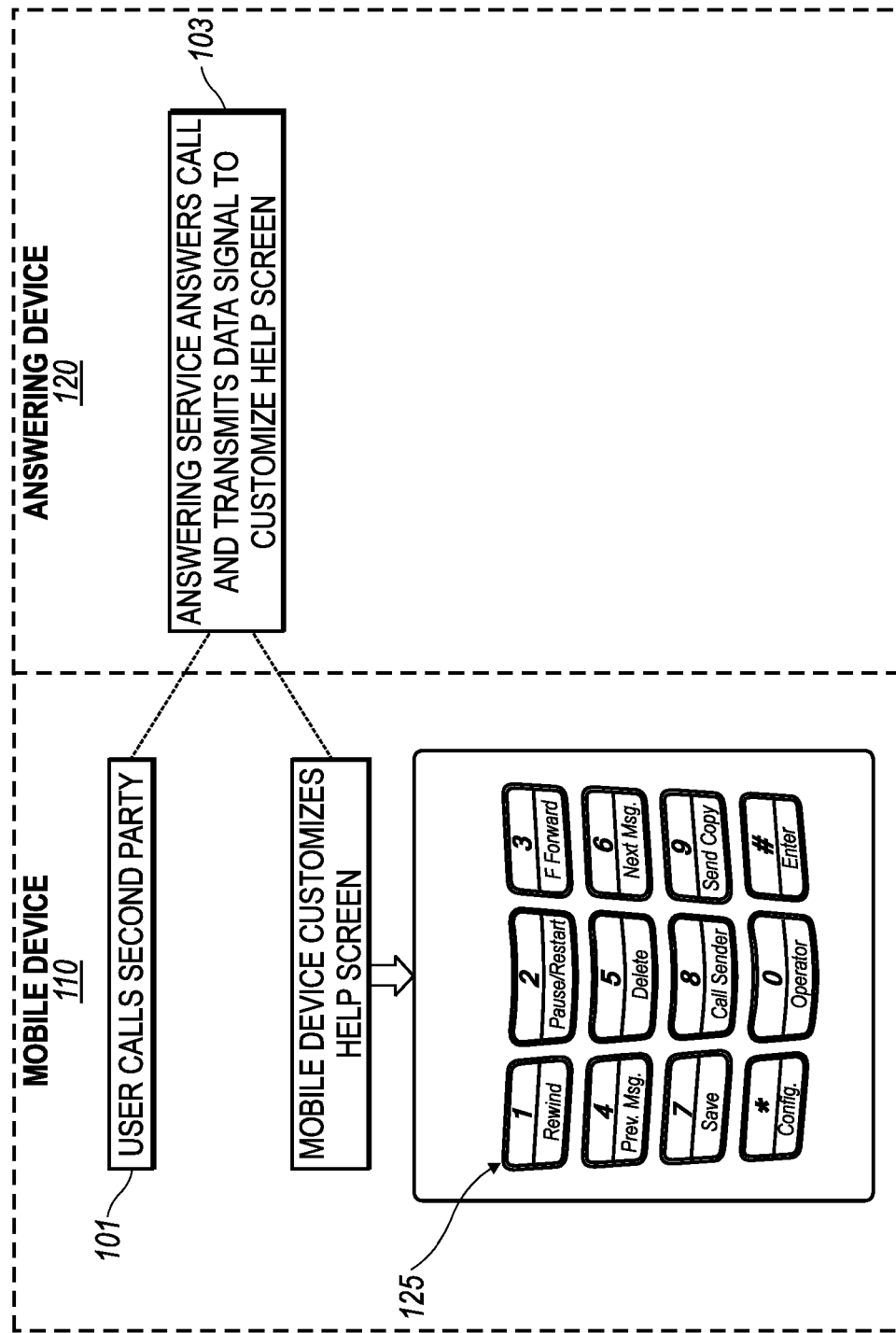
FIG. 2 is flow-chart of an example method for receiving help screen information from an example answering service.

In another example, a help screen 125 is programmable to include customized indicia displayed on the keys shown on the help screen 125. For example, as shown in FIG. 2, a user initiates a call to a second party 101 on a mobile device 110. In response to the call, an answering service 120 answers the call and sends a data signal that tells the mobile device 10 to display a help screen 25 that is customized for that phone call 103. The mobile device receives the data signal and generates a customized help screen 125.

As shown in FIG. 2, the answering service 120 in this example is a voice mail system in which the user has a mail box. The text shown on the virtual representation of the keys on the help screen 125 indicates which key on the keyboard of the mobile device 110 will be operable to input the desired command. This technique allows the user to not have to remember the command functions for his voice mail, listen to a long message that reviews the command functions associated with each number, or carry a reference card. Other types of data could alternatively be transmitted by the answering service or other third party. In addition, the type of information transmitted could change depending upon the location of the user in the voice mail system's programming. Examples of other types of help screens are discussed below.

Figure 3:
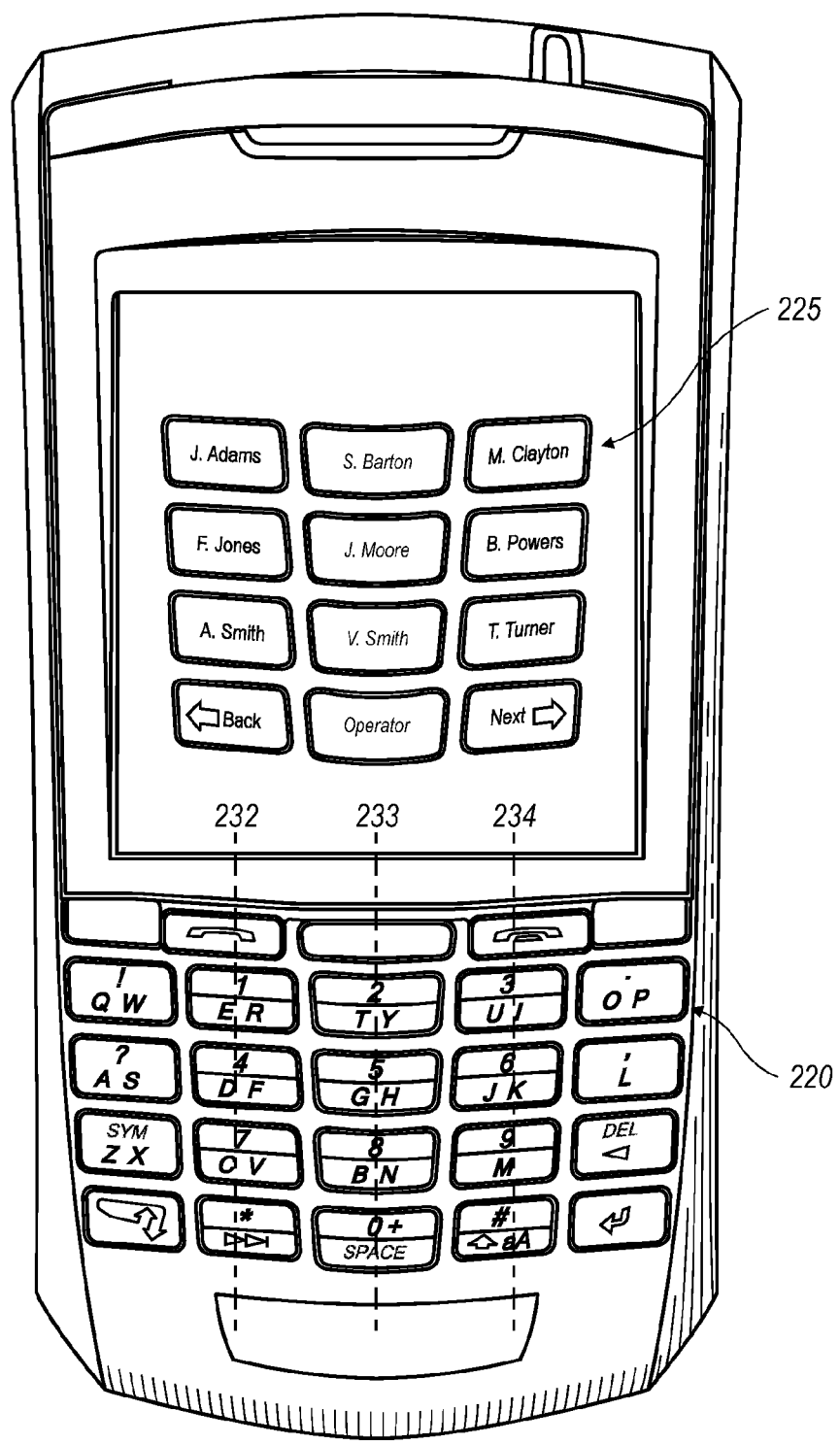
FIG. 3 is a front view of an example mobile communication device showing an example directory help screen.

Another example application includes a directory system implemented as shown in FIG. 3. The help screen 225 in FIG. 3 shows individual names on the top nine keys of the virtual representation of the three middle columns 232-234 of the keyboard. Pressing a key on the keyboard 220 that corresponds to one of the names on the help screen 225 automatically dials that persons extension. By pressing the lower right or lower left keys, other screens of names can be shown, and the operator can be reached by pressing the "0" key.

Figure 4:
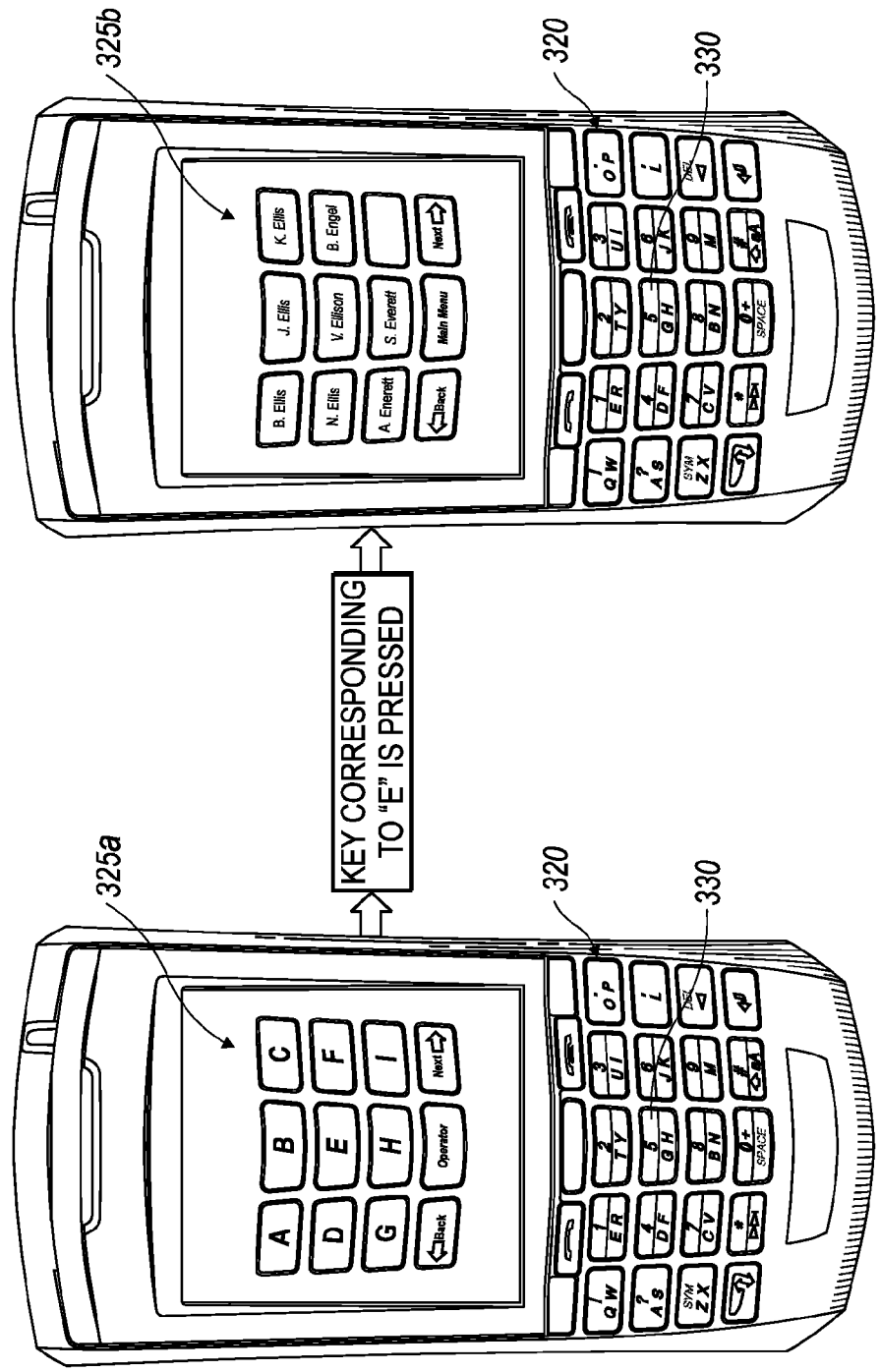
FIG. 4 is an example graphical progression of a selection of a second tier help screen on an example mobile device.

In the example shown in FIG. 4, a tiered directory system is implemented. In a first help screen 325a, an alphabetic directory is transmitted from an answering service or stored on the mobile communication device, and is presented on a virtual representation of a portion of the keypad 320. By pressing one of the keys on the keypad 320, for example, the key 330 that corresponds to the letter E, a second help screen 325b is generated. The second help screen 325b lists last names starting with the letter "E." The user can then press the key on the keypad 320 that corresponds to the name they wish to dial, and the extension for that person will be dialed. This tiered directory would be appropriate for a larger organization.

Alternatively, the ITU standard E.161 alphabetic arrangement could be used as the first help screen 325a, instead of just a single letter for each key. The second help screen 325b would then have a group of names corresponding to the grouping of letters on the ITU standard E.161 alphabetic arrangement.

Figure 5:
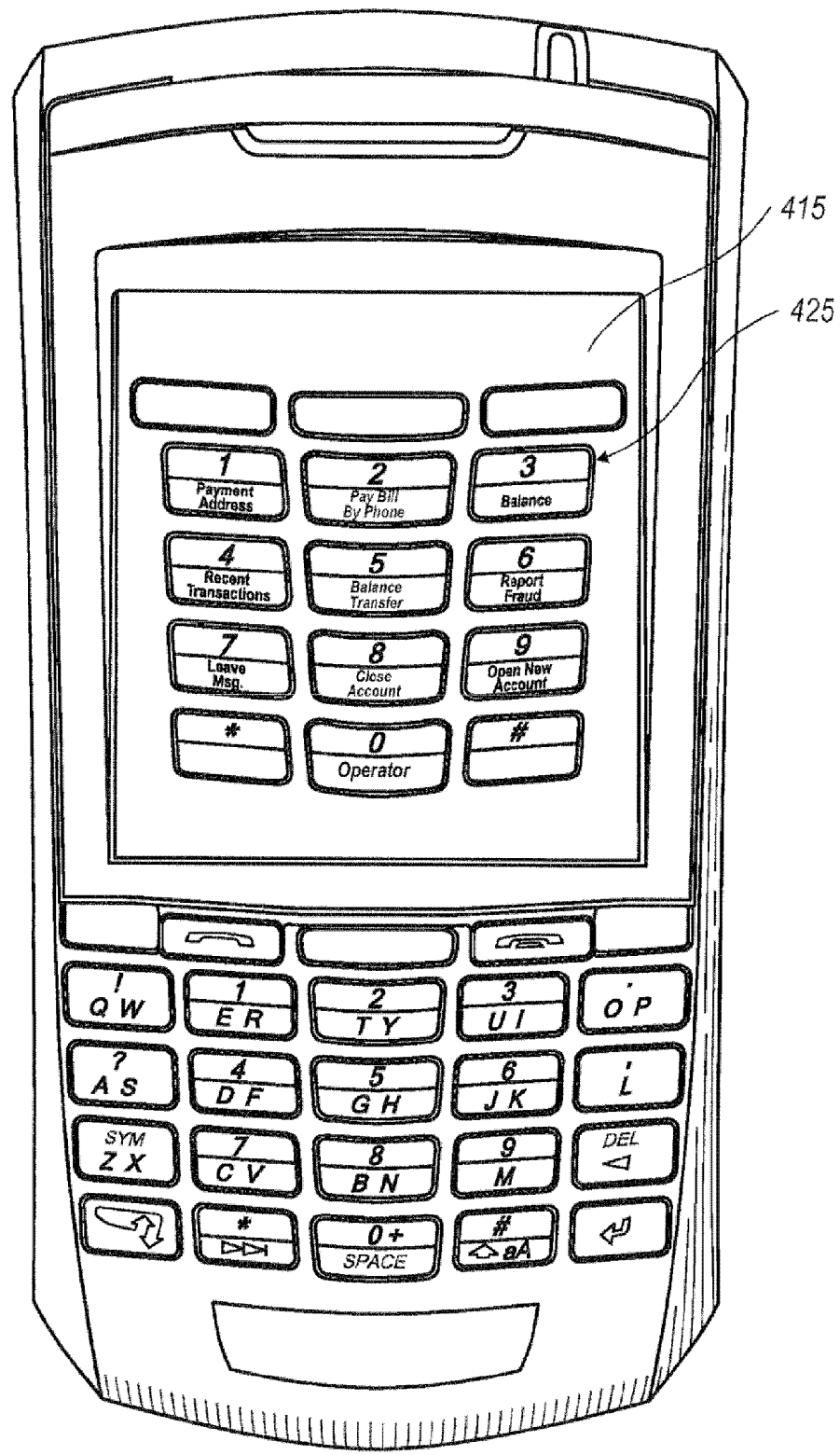
FIG. 5 is an example mobile communication device displaying a help screen for an example answering service menu system.

The help screen can also be used with many other telephone menu systems that one might encounter in calling any organization that has an answering service with options. The answering service could send a data transmission with help information for navigating the menu system, or it could be stored on the mobile communication device. For example, a credit card company might have an option menu as shown in FIG. 5. Instead of a user having to listen to the entire menu, they can see the options graphically and more quickly on a help screen with a virtual representation 425 as soon as the data signal is transmitted, processed, and displayed on the display screen 415. If the help information is stored, the user will see the virtual representation on the help screen 425 as soon as the help information is processed and displayed on the display screen 415.

Figure 6:
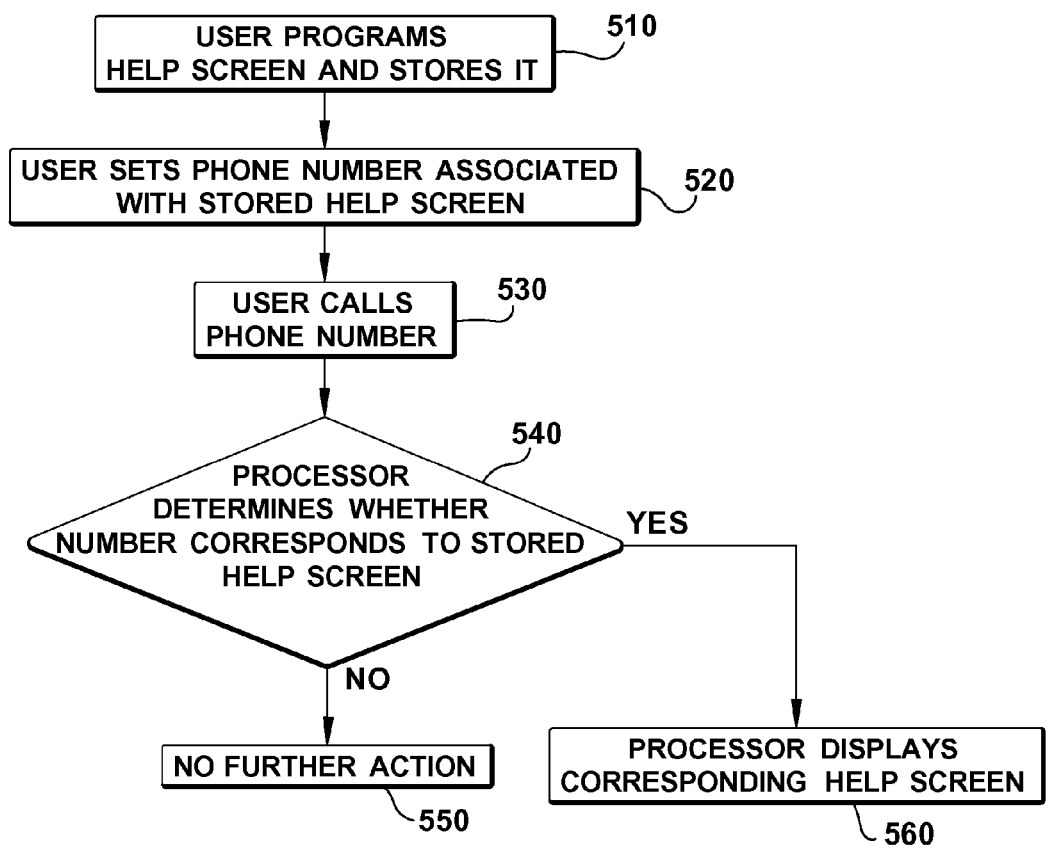
FIG. 6 is a flow-chart of an example method for a user customized help screen that is activated by a user set phone number.

In another example, shown in FIG. 6, users can customize a help screen to display specified messages by programming the mobile device themselves. In the first step 510, the user programs the help screen to display specified messages on specified keys and stores it in memory on the mobile device. These messages may correspond to the user's personal or work voice mail, such as the help screen 125 shown in FIG. 2. Other example messages may correspond to a menu system for an organization's answering service that the user frequently accesses, among other messages that might correspond to telephone keys.

In the second step 520, the user may specify a phone number and associate it with the stored help screen. Then in the third step 530 the user calls a phone number. After the phone number is called, in the fourth step 540, the processor on the mobile device determines whether the number called is a number associated with a stored help screen. If it is not, then no further action is taken 550, and the call takes place as normal. If the number called is associated with a stored help screen, then in a fifth step that help screen is displayed 560. The help screen may be closed when the call disconnects.

As an alternative to the technique shown in FIG. 6, a stored help screen need not be associated with a phone number. In this example, the user can manually select the help screen whenever it is desired by pressing a key, a series of keys, such as the "ALT" key, navigating through a menu system, or by other known methods.

Figure 7:
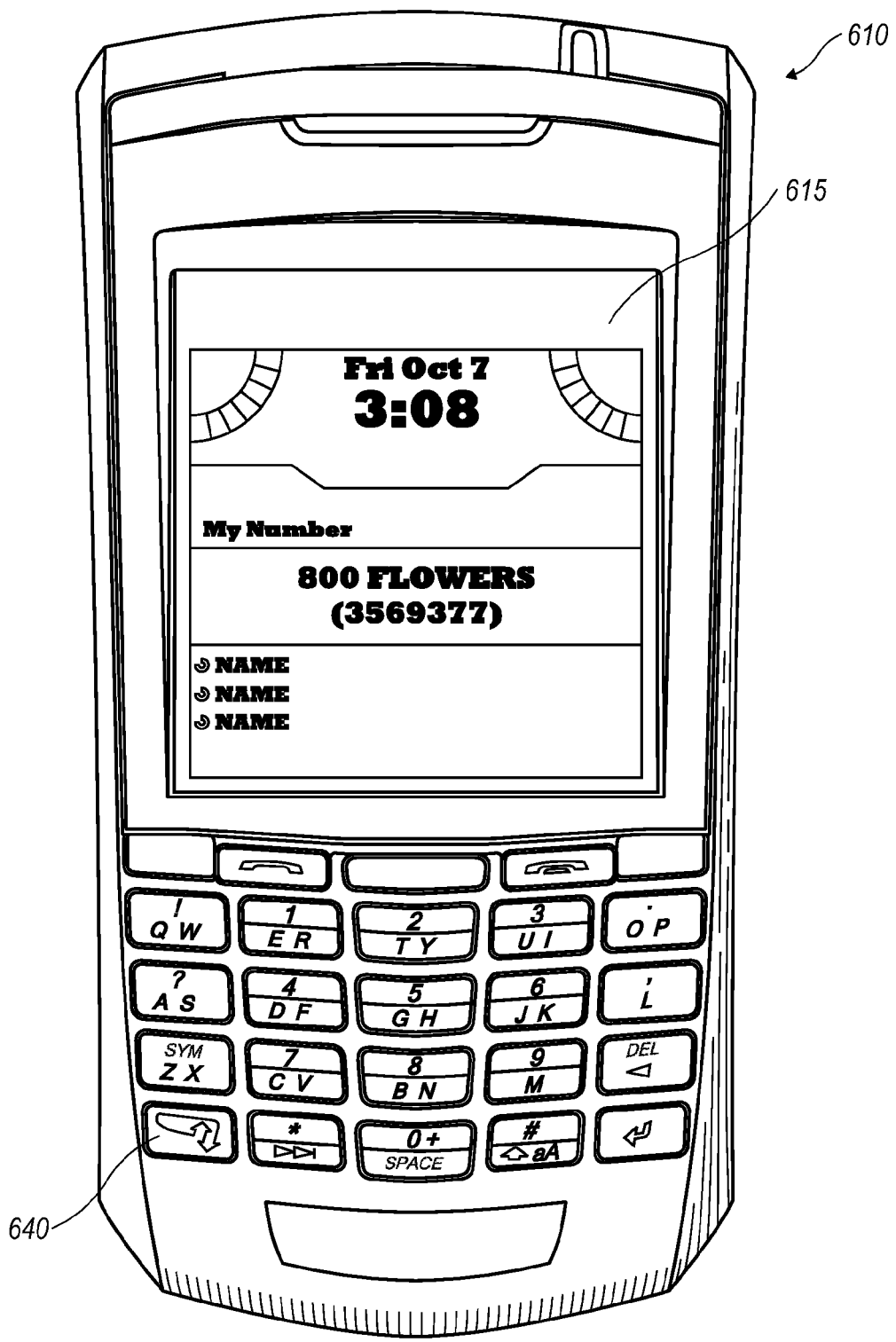
FIG. 7 is an example mobile communication device displaying a screen with an alphabetically represented phone number above its corresponding numeric number.

In another example, shown in FIG. 7, the user enters a phone number defined by letters, in this case "1-800-FLOW-ERS," just as they are printed on the non-ITU standard E.161 keypad. However, the numbers corresponding to the letters are shown on the display screen 615 of the mobile device 610 as additional display information. This feature prevents confusion and lets the user know that they are dialing a number and what numbers the letters represent.

In FIG. 7, the corresponding numbers are shown displayed beneath the letters on the screen, but the numbers could be displayed at other locations, such as above or beside the keys, if desired. The display location of the numbers is not critical.

To trigger dialing by letter instead of by number, as known in the art, the user can press the ALT key 640 in combination with an alphabetic key. The user may also use a multi-tap technique to dial by letter instead of number. A user could alternatively activate a control key or some other mechanism instead of using the ALT key 640.

The examples described above could be used to enter DTMF codes into a directory or other system once the recipient of a call has answered. The examples described above could also be utilized on a telephone that has a processor and a display capable of rendering a help screen showing text and associating it with keys on the keypad.

Figure 10:
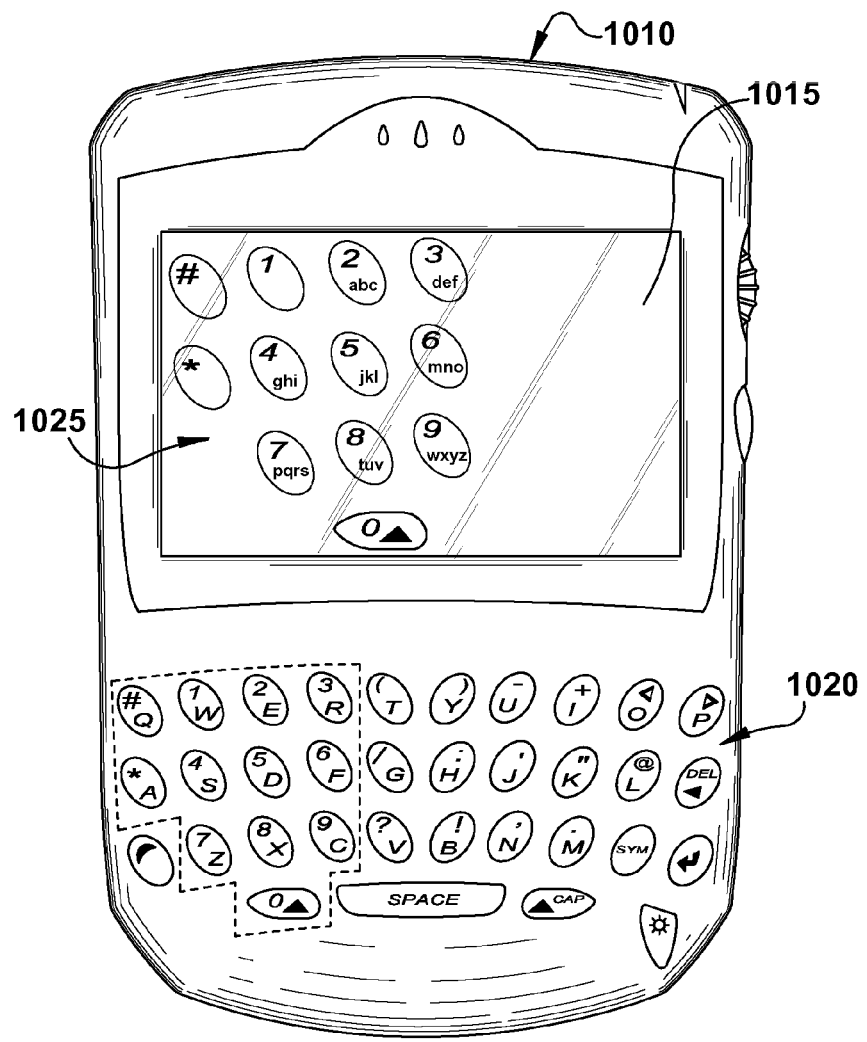
FIG. 10 is another example mobile communication device.

The above described features may also be used with a full-size standard key arrangement, such as the full QWERTY arrangement 1020 shown in FIG. 10. In this case, the numbers share keys with a single alphabetic character. The same problem that existed with a reduced alphabetic keyboard format are also present on a full-size alphabetic arrangement. That is, phone numbers that are given as letters correspond to the ITU standard E.161 key arrangement, and therefore dialing by letter on a full-QWERTY keyboard will not produce the correct DTMF codes. While software may be provided to convert the QWERTY keyboard to dial by letter and produce the correct DTMF codes, the user may still be confused as to what is really being dialed. Therefore a help screen 1025, similar to the one described in FIG. 1, is presented on the display 1015. This help screen 1025, like the help screen of FIG. 1, also is a virtual representation of the associated keys on the keyboard 1020, in that it represents the same shape and arrangement of the keys that are used to enter DTMF codes in the telephone mode. In this example, the virtual representation is shifted to the left side of the display 1015 so as to indicate that the associated keys are located on the left side of the keyboard. This feature better enables the user to readily identify the associated keys.

A help screen such as that shown in FIG. 7 may also be used on the mobile communication device 1010 of FIG. 10, as described above to enable the user to visually see what numbers are being entered to be dialed for the letters that the user presses.

Figure 8:
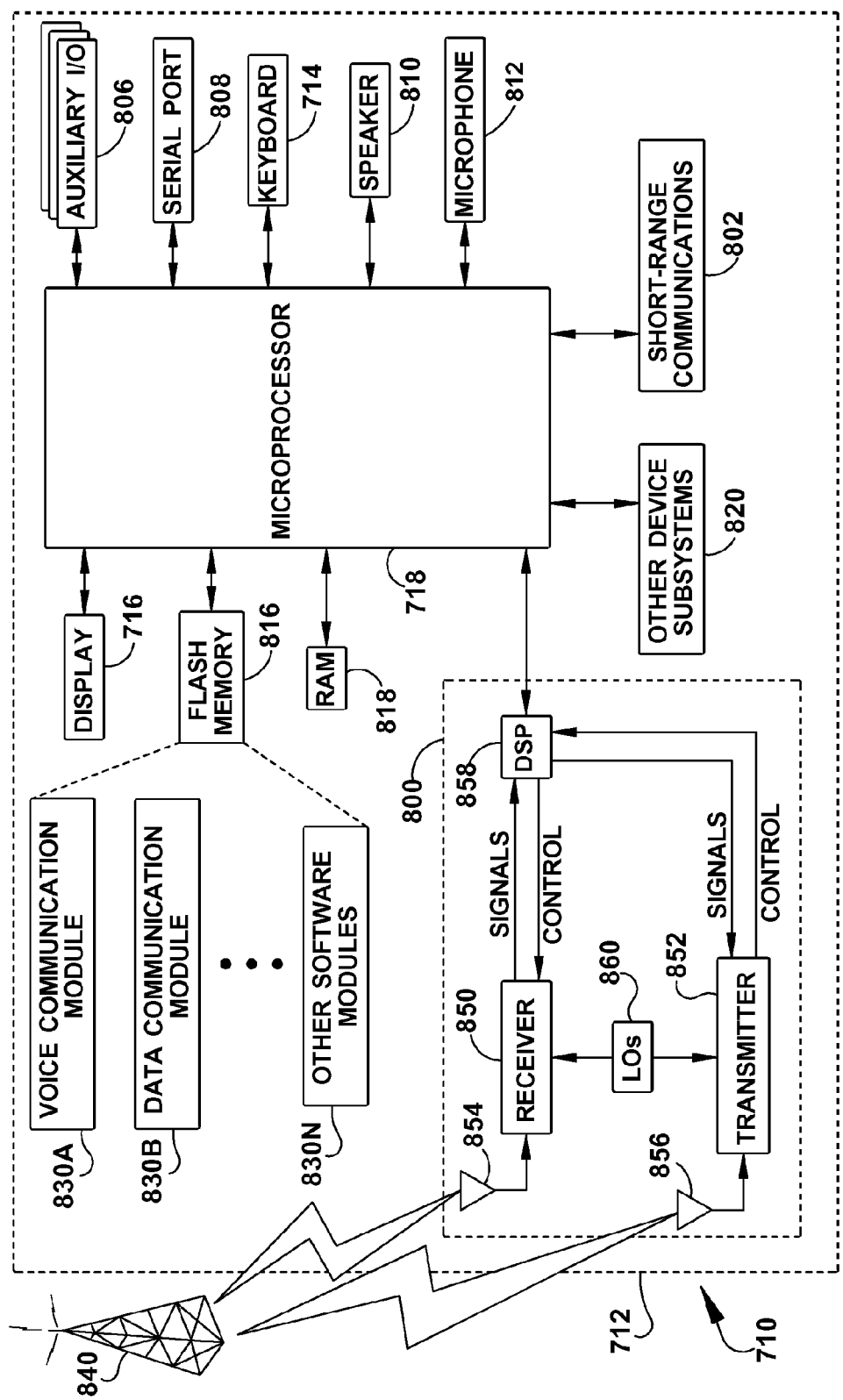
FIG. 8 is a schematic for an example mobile communication device.
Figure 9:
FIG. 9 is an ITU standard E.161 phone keypad.

The handheld mobile communication devices, presented in FIGS. 1, 3, 4, 5, 7, and 10 include similar features, such as a housing, a keyboard, and an output device. These and other features are shown schematically in FIG. 8. The output device shown is a display 716, which is preferably a full graphic LCD. Other types of output devices may alternatively be utilized. A processing device 718, which is shown schematically in FIG. 8, is contained within the housing 712 and is coupled between the keyboard 714 and the display 716. The processing device 718 controls the operation of the display 716, as well as the overall operation of the mobile communication device 710, in response to actuation of keys on the keyboard 714 by the user.

The housing 712 may be elongated vertically, or may take on other sizes and shapes, including a clamshell housing structure, among other structures. The keyboard may include a mode selection key, or other hardware or software for switching between text entry and telephony entry.

In addition to the processing device 718, other parts of the mobile communication device 710 are shown schematically in FIG. 8. These include a communications subsystem 800; a short-range communications subsystem 802; the keyboard 714 and the display 716, along with other input/output devices 806, 808, 810, and 812; memory devices 816, 818; and various other device subsystems 820. The mobile communication device 710 is preferably a two-way RF communication device having voice and data communication capabilities. In addition, the mobile communication device 710 preferably has the capability to communicate with other computer systems via the Internet.

Operating system software executed by the processing device 718 is preferably stored in a persistent store, such as a flash memory 816, but may be stored in other types of memory devices, such as a read only memory (ROM) or similar storage element. In addition, system software, specific device applications, or parts thereof, may be temporarily loaded into a volatile store, such as a random access memory (RAM) 818. Communication signals received by the mobile communication device may also be stored to the RAM 818.

The processing device 718, in addition to its operating system functions, enables execution of software applications 830A-830N on the device 710. A predetermined set of applications that control basic device operations, such as data and voice communications 830A and 830B, may be installed on the device 710 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 840. Preferably, the PIM data items are seamlessly integrated, synchronized and updated via the wireless network 840 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application and expressly incorporated herein by reference.

Communication functions, including data and voice communications, are performed through the communication subsystem 800, and possibly through the short-range communications subsystem. The communication subsystem 800 includes a receiver 850, a transmitter 852, and one or more antennas 854, 856. In addition, the communication subsystem 800 also includes a processing module, such as a digital signal processor (DSP) 858, and local oscillators (LOs) 860. The specific design and implementation of the communication subsystem 800 is dependent upon the communication network in which the mobile communication device 710 is intended to operate. For example, a mobile communication device 710 may include a communication subsystem 800 designed to operate with the MOBITEX, DATATAC or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 710.

Network access requirements vary depending upon the type of communication system. For example, in the MOBITEX and DATATAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 710 may send and receive communication signals over the communication network 840. Signals received from the communication network 840 by the antenna 854 are routed to the receiver 850, which provides for signal amplification, frequency down conversion, filtering, channel selection, etc., and may also provide analog to digital conversion. Analog-to-digital conversion of the received signal allows the DSP 858 to perform more complex communication functions, such as demodulation and decoding. In a similar manner, signals to be transmitted to the network 840 are processed (e.g. modulated and encoded) by the DSP 858 and are then provided to the transmitter 852 for digital to analog conversion, frequency up conversion, filtering, amplification and transmission to the communication network 840 (or networks) via the antenna 856.

In addition to processing communication signals, the DSP 858 provides for control of the receiver 850 and the transmitter 852. For example, gains applied to communication signals in the receiver 850 and transmitter 852 may be adaptively controlled through automatic gain control algorithms implemented in the DSP 858.

In a data communication mode, a received signal, such as a text message or web page download, is processed by the communication subsystem 800 and is input to the processing device 718. The received signal is then further processed by the processing device 718 for an output to the display 716, or alternatively to some other auxiliary I/O device 806. A device user may also compose data items, such as e-mail messages, using the keyboard 714 and/or some other auxiliary I/O device 806, such as a touchpad, a rocker switch, a thumb-wheel, or some other type of input device. The composed data items may then be transmitted over the communication network 840 via the communication subsystem 800.

In a voice communication mode, overall operation of the device is substantially similar to the data communication mode, except that received signals are output to a speaker 810, and signals for transmission are generated by a microphone 812. Alternative voice or audio I/O subsystems, such as a voice message recording subsystem, may also be implemented on the device 710. In addition, the display 716 may also be utilized in voice communication mode, for example to display the identity of a calling party, the duration of a voice call, or other voice call related information.

The short-range communications subsystem enables communication between the mobile communication device 710 and other proximate systems or devices, which need not necessarily be similar devices. For example, the short-range communications subsystem may include an infrared device and associated circuits and components, or a BLUETOOTH communication module to provide for communication with similarly-enabled systems and devices.

Although the keyboards or keypads described herein are in the context of a plurality of keys, the term keyboard or keypad may also be used equally in the context of a touchscreen or other touch-type keyboards.

While various features of the claimed embodiments are presented above, it should be understood that the features may be used singly or in any combination thereof. Therefore, the claimed embodiments are not to be limited to only the specific embodiments depicted herein.

Further, it should be understood that variations and modifications may occur to those skilled in the art to which the claimed embodiments pertain. The embodiments described herein are exemplary. The disclosure may enable those skilled in the art to make and use embodiments having alternative elements that likewise correspond to the elements recited in the claims. The intended scope may thus include other embodiments that do not differ or that insubstantially differ from the literal language of the claims. The scope of the example embodiments is accordingly defined as set forth in the patent claims.

The invention claimed is:

1. A communication device, comprising:
   a display screen;
   a keyboard having keys, each key having associated indicia corresponding to at least one of alphabetic characters, numbers, and functions, wherein the keys having numbered indicia are arranged in a numeric phone arrangement and operable to input corresponding Dual-Tone Multi-Frequency (DTMF) codes corresponding to the numbers and the keys having alphabetic characters are arranged in a non-ITU Standard E.161 phone keypad layout and operable to input DTMF codes corresponding to the numbers of a ITU Standard E.161 phone keypad layout when entering a telephone number; and
   a processor communicatively coupled with said keyboard and said display screen, said processor being configured to:
      receive an input, via said keyboard, of one or more alphabetic characters of a phone number having alphabetic characters and numbers; and
      cause the display of the inputted alphabetic characters on said display screen.

2. The communication device of claim 1 wherein the keys having alphabetic character are arranged in a QWERTY layout or reduced QWERTY layout.

3. The communication device of claim 1 wherein the keys having alphabetic characters are arranged in a AZERTY, DVORAK, or QWERTZ layout, or a reduced version of any one of said layouts.

4. The communication device of claim 1 wherein the processor is configured to cause, on the display screen, the display of:
   a DTMF phone number having numbers corresponding to the alphabetic characters of a ITU Standard E.161 phone keypad layout.

5. The communication device of claim 4 wherein said DTMF phone number is displayed below the phone number.

6. The communication device of claim 1 wherein an additional key is pressed in order to enter the alphabetic character.

7. The communication device of claim 1 wherein an ALT key is pressed in order to enter the alphabetic character.

8. The communication device of claim 1 wherein an additional key is pressed in combination with the alphabetic character in order to enter the alphabetic character.

9. The communication device of claim 1 wherein an ALT key is pressed in combination with the alphabetic character in order to enter the alphabetic character.

10. The communication device of claim 1 wherein a multi-tap technique is used to enter the alphabetic character.

11. A non-transitory medium configured to store instructions for execution by a processor of a communication device, the non-transitory medium includes instructions to:
   receive an input, via a keyboard, of one or more alphabetic characters of a phone number having alphabetic characters and numbers, with each key of the keyboard having associated indicia corresponding to at least one of alphabetic characters, numbers, and functions, wherein the keys having numbered indicia are arranged in a numeric phone arrangement and operable to input corresponding DTMF codes corresponding to the associated numbers and the keys having alphabetic characters are arranged in a non-ITU Standard E.161 phone keypad layout and operable to input DTMF codes corresponding to the numbers of a ITU Standard E.161 keypad layout when entering a phone number; and
   cause display of the inputted alphabetic characters on a display screen of the communication device.

12. The non-transitory medium of claim 11 wherein the non-transitory medium includes instructions to cause, on the display screen, the display of:
   a DTMF phone number corresponding to the alphabetic characters of a ITU Standard E.161 phone keypad layout.

13. The non-transitory medium of claim 12 wherein said DTMF phone number is displayed below the phone number.

14. The non-transitory medium of claim 11 wherein the keys having alphabetic character are arranged in a QWERTY layout or reduced QWERTY layout.

15. The non-transitory medium of claim 11 wherein the keys having alphabetic character are arranged in a AZERTY, DVORAK, or QWERTZ layout, or a reduced version of any one of said layouts.

16. The non-transitory medium of claim 11 wherein the received input further includes an additional key being pressed in order to enter the alphabetic character.

17. The non-transitory medium of claim 16 wherein the additional key is an ALT key in order to enter the alphabetic character.

18. The non-transitory medium of claim 16 wherein the ALT key is pressed in combination with the alphabetic character in order to enter the alphabetic character.

19. A communication device, comprising:
   a display screen;
   a keyboard having keys, each key having associated indicia corresponding to at least one of alphabetic characters, numbers, and functions,
   with the keys having numbered indicia being arranged in a numeric phone arrangement in accordance with the numbered indicia arrangement of ITU Standard E.161 phone keypad arrangement and operable to input corresponding Dual-Tone Multi-Frequency (DTMF) codes corresponding to the numbers,
   with the keys having alphabetic characters indicia being arranged in a non-ITU Standard E.161 phone keypad layout and operable to input DTMF codes corresponding to the numbers of a ITU Standard E.161 phone keypad layout when entering a telephone number; and
   a processor communicatively coupled with said keyboard and said display screen, said processor being configured to:
      an input, via said keyboard, of one or more alphabetic characters of a phone number having alphabetic characters and numbers; and
      cause the display of the inputted alphabetic characters on said display screen.

20. The communication device of claim 19 wherein the processor is further configured to cause the display, on the display screen, of the inputted alphabetic characters and the corresponding numbers for the corresponding DTMF codes.

* * * * *